United States Patent [19]
Hamahara et al.

[11] Patent Number: 5,834,128
[45] Date of Patent: Nov. 10, 1998

[54] ORGANIC FILM-COATED ZINC PLATED STEEL SHEET

[75] Inventors: Kyoko Hamahara; Shuichi Asahina; Hisatada Nakakoji; Tomokatsu Katagiri; Kazuo Mochizuki, all of Chiba, Japan

[73] Assignee: Kawasaki Steel Corporation, Japan

[21] Appl. No.: 702,247

[22] Filed: Aug. 28, 1996

[30] Foreign Application Priority Data

Aug. 28, 1995 [JP] Japan .................................. 7-218983
Oct. 4, 1995 [JP] Japan .................................. 7-257488

[51] Int. Cl.$^6$ .................................................... B32B 15/08
[52] U.S. Cl. .......................................... 428/626; 428/659
[58] Field of Search .................................... 428/457, 461, 428/626, 659

[56] References Cited

U.S. PATENT DOCUMENTS 5,360,676  11/1994  Kuguminato et al. .

FOREIGN PATENT DOCUMENTS

| | | |
|---|---|---|
| 0531575A1 | 3/1993 | European Pat. Off. . |
| 0 556 834 A2 | 8/1993 | European Pat. Off. . |
| 0 659 890 A2 | 6/1995 | European Pat. Off. . |
| 0 565 066 A1 | 10/1996 | European Pat. Off. . |
| 2698380 | 5/1994 | France . |
| 63-310924 | 12/1988 | Japan . |
| 4-062150 | 2/1992 | Japan . |
| 5-202422(A) | 8/1993 | Japan . |

*Primary Examiner*—Christopher Raimund
*Attorney, Agent, or Firm*—Austin R. Miller

[57] ABSTRACT

An organic film-coated plated steel sheet is disclosed which includes a base steel sheet, a zinc-base plated layer disposed thereon, and an organic film layer formed by cathodic polymerization of one or more monomers and superposed as an outermost layer on the zinc-base plated layer. The steel is excellent in corrosion resistance, weldability, electrodeposition paintability or paint adhesion and, thus, is suitable as a rust-proof steel sheet particularly for use in automobile bodies. Also disclosed is a process for producing that steel with less production equipment and reduced cost.

6 Claims, 1 Drawing Sheet

FIG. 1
CONVENTIONAL
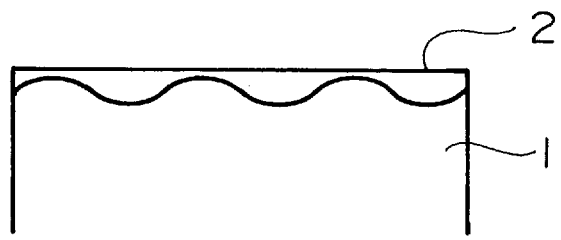

ORGANIC FILM-COATED ZINC PLATED STEEL SHEET

BACKGROUND OF THE INVENTION

1. Field of the Invention

This invention relates to an organic film-coated plated steel sheet, and a process for its production, which sheet excels in corrosion resistance, weldability, electrodeposition ability or paint adhesion.

2. Description of the Related Art

An increasing number of steel sheet treated on their surfaces have recently been applied to the automotive industry to comply with demands for automobile bodies having enhanced resistance to corrosion. Such a surface-treated steel sheet is typified by a zinc-plated steel sheet, a zinc alloy-plated steel sheet and the like. Moreover, a greater magnitude of corrosion resistance has been required for bag structures and bent or hemmed portions disposed inwardly of the automobile body and exposed to wet conditions since the bags and hems are often difficult to paint completely subsequent to assembly of the body.

Certain steel sheet has been proposed to meet the above noted requirements as disclosed for instance in Japanese Unexamined Patent Publication Nos. 3-130141 and 2-258335. They are of a multi-layered type having a zinc- or zinc alloy-plated steel sheet, a chromate layer and an organic polymer layer superimposed in that order. The organic polymer layer contains silica and has a coating thickness of not more than several microns ($\mu$m). This type of steel sheet offers markedly excellent corrosion resistance even without the need for painting after assembly of the automobile body and, hence, has predominated in forming inner surfaces of the body.

For economic reasons the automotive industry has been compelled to effect further reductions in production costs.

The multi-layered steel sheet stated above is produced by treating a base steel sheet with zinc-based plating, followed by formation of a chromate film and an organic film on the steel sheet. Such mode of production uses a coater and a baking oven, respectively, for Zn-base plating, chromate film formation and organic film formation. Plating equipment is completely structurally different from coating and baking equipment. They have varying speeds of production lines and variable factors of production controls. In a commonly practiced production system, therefore, coiling is first performed after completion of Zn-base plating. Subsequent processing is conducted in coating and baking equipment installed separately from the plating equipment. This involves additional equipment and facilities as well as considerable increase in production cost, thereby forcing both automobile and steel manufacturers to shoulder heavy burdens.

According to the present invention, an organic film-coated steel sheet can be obtained with reserve tanks for Zn-base plating and post-treatment facilities utilized to good advantage and without incurring further construction costs. For example, a plating line alone leads to the production or coiling of the desired coated steel, resulting in a noticeable decline in production cost. In other words, the method of the invention allows the existing equipment, if provided with plating facilities, easily to switch over from the formation of a plated steel sheet to the production of an organic film-coated steel sheet that has conspicuously excellent resistance to rust.

Electrodeposition painting is in common use for the formation of organic films on the surfaces of steel sheet by means of electrolysis. Electrodeposition painting is a method in which an aqueous solution containing a water-based or emulsified polymer and a pigment is subjected to electrical charging, whereby the polymer and pigment migrate and are separated out. Electrodeposition painting is less effective than coaters in achieving thickness uniformity. In the case of formation of an organic film with a thickness of several tens of microns ($\mu$m), a slight thickness irregularity may be tolerable.

It is necessary, however, for use in automobiles, for the organic film to be coated on the steel sheet at no more than several microns ($\mu$m) in thickness so as to ensure good subsequent weldability. In such a thin-walled film, thickness uniformity has a strong effect on corrosion resistance. For this and other reasons, electro-deposition coating is unacceptable; it results in increased cost and needs further operations including baking after coating, and high-voltage electrolysis treatment.

Electrolytic polymerization is another means for forming an organic film by electrolysis. This mode of polymerization uses a monomer as a starting material. The monomer is caused to polymerize, through electrolysis, simultaneously with film formation with eventual coating of an organic polymer film directly over the substrate. Electrolytic polymerization has in recent years found rapid application, mainly in the fields of condensers and electronic components as disclosed for example in Japanese Examined Patent Publication Nos. 3-65008, 3-61314 and 4-7521. These publications each pertain to an organic film with particular emphasis upon the characteristic of electrical conductivity, but fail to consider corrosion resistance or to teach that such films could render the corresponding substrate anticorrosive.

Japanese Examined Patent Publication No. 50-15485 and Japanese Unexamined Patent Publication No. 55-16075 each disclose a method of surface-treating a metal structure by directly forming an electrolytically polymerized film over the surface of the metal. Each such method is contrived as a replacement for electrodeposition painting to attain cost savings by omitting the usual baking operation and reducing electrical requirements, namely by reducing voltage. In those references organic films are coated over the surface of an electrically conductive substrate by electrodeposition or by coater means, in most cases, to achieve corrosion resistance or otherwise improve rustproofness. The rustproofness property results from insulation, impermeability to water and oxygen and the like, and the organic film should have a thickness of not more than several tens of microns ($\mu$m), thereby gaining the insulation and impermeability properties closely associated with rustproofness.

In the case where electrolytic polymerization is employed in forming an organic film, insulation and rust resistance may be obtained, as disclosed in Japanese Examined Patent Publication No. 50-15485 above, but only by prolonged electrolysis. Furthermore, as the film thickness increases, higher voltage is required to compensate for resistance of the film thickness. This makes film formation difficult. It also results in increased electrical usage. This means that cost savings flowing from omitted baking operations become substantially offset. To add to those problems, suitably useful or electrolytically polymerizable monomers are restrictive, and the resultant polymers are incapable of modification and crosslinking. Consequently, electrolytic polymerization is still unfeasible for practical purposes as providing a substitute for a general organic film made to have rust resistance through insulation.

OBJECTS OF THE INVENTION

In order to solve the foregoing problems of the prior art, the present invention has for one of its primary objects to provide a new organic film-coated plated steel sheet which is resistant to corrosion, weldable, paintable by electrodeposition or adhesive to paints, and is excellent as a rustproof steel sheet particularly for use in automobile bodies.

Another object of the invention lies in the provision of a process for producing such steel with fewer equipment requirements and reduced production cost.

Other objects and advantages of the invention will become apparent to those skilled in the art from the drawings, the detailed description of the invention and the appended claims.

SUMMARY OF THE INVENTION

According to one important aspect of the invention, there is provided an organic film-coated plated steel sheet comprising a steel sheet, a zinc-base plated layer disposed thereon, with or without an optional overlayer containing chromium, and an organic film layer is formed by cathodic polymerization of at least one monomer and polymerized on the outermost layer. The organic film-coated plated steel sheet preferably includes a chromate layer interposed between the zinc-base plated layer and the organic film layer. Preferably, the zinc-base plated layer is deposited in an amount of about 10 to 90 g/m$^2$ on the steel sheet, and the organic film layer is polymerization coated in an amount of about 0.01 to 3 g/m$^2$. It is further preferred that the zinc-coated plated layer is deposited in an amount of about 10 to 90 g/m$^2$, the chromate layer is coated in an amount of about 10 to 500 mg/m$^2$ expressed as Cr, and the organic film layer is coated in an amount of about 0.01 to 3 g/m$^2$.

In this invention an intervening layer containing Zn or Cr is provided as a site for polymerization of the monomer. The monomer is preferably selected from the group consisting of vinyl pyridine, acrylic acid, methacrylic acid, acrylic acid ester, methacrylic acid ester, acrylonitrile, styrene, crotonic acid, acetonitrile, pyrrole, thiophene, azulene, phenol and aniline, and derivatives thereof.

This invention further relates to a process for the production of an organic film-coated plated steel sheet, which comprises the steps of plating a base steel sheet on either one or both of its surfaces with zinc-based metal, and subsequently carrying out electrolytic polymerization in an cathodic liquid containing at least one organic monomer, thereby forming an organic film over the zinc-base plated steel sheet. Preferably, the process further includes the intermediate step of treating the zinc-base plated steel sheet with a chromate, and subsequently carrying out electrolytic polymerization in an electrolytic liquid containing at least one monomer, thereby polymerizing an organic film layer on the chromate-treated steel sheet. Zinc-based plating may be deposited in an amount of about 10 to 90 g/m$^2$, and the organic film may be applied in an amount of about 0.01 to 3 g/m$^2$. Further, the zinc-based plating step is desirably conducted with a deposit of about 10 to 90 g/m$^2$, the chromate treatment with an amount of about 10 to 500 mg/m$^2$ expressed as Cr, and the organic film formation about 0.01 to 3 g/m$^2$.

In cathodic polymerization the monomer may be selected from the group consisting of vinyl pyridine, acrylic acid, methacrylic acid, acrylic acid ester, methacrylic acid ester, acrylonitrile, styrene, crotonic acid and acetonitrile, and derivatives thereof.

The cathodic polymerization is preferably effected at a current density of not lower than about 1 A/dm$^2$ and for an electrolytic time of not longer than about 10 seconds.

BRIEF DESCRIPTION OF THE DRAWINGS

FIG. 1 is a schematic view showing the shape of an organic film formed on a steel sheet by coater means.

DETAILED DESCRIPTION OF THE INVENTION

Figure 2:
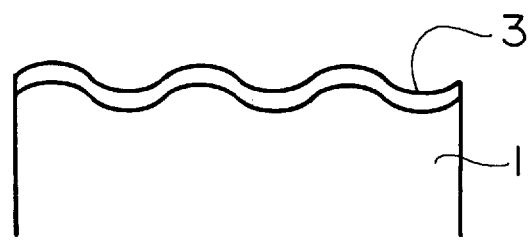
FIG. 2 is a view similar to FIG. 1, but showing an organic film formed by cathodic polymerization.

It will be appreciated that the following description is intended to refer to the specific embodiments of the invention selected for illustration in the drawings and as described in the Examples and is not intended to limit the invention, other than in the appended claims.

The organic film-coated plated steel sheet according to the present invention is most preferably used for automobiles, although many other uses are possible. To this end, the organic film should still be weldable, or paintable by electrodeposition as discussed hereinabove. In order to meet these requirements the organic film needs to have exceptionally small thickness, say of not more than the order of several microns ($\mu$m). This leaves the problem, however, that the resulting organic film is rather permeable to water and oxygen and, hence, less resistant to rust.

In the organic film-coated plated steel sheet of the invention, rust resistance depends mainly upon the sacrificial action of rustproofness of Zn-base plating, so that the eluation rate of Zn-base metal affects to a great extent the service life of the finished steel sheet. If it is possible to maintain stable Zn corrosive materials which are liable to be formed on the surface of a Zn-base plated layer placed on a substrate, then Zn shows a sharp decline in its eluation rate. Thus, the organic film should most importantly have a role to retain the Zn corrosive materials and protect the Zn against eluation. It is important that rust resistance can be attained in accordance with this invention only when the organic film is brought into cooperative relation with the Zn-base plated layer.

To hold stable the corrosive materials that corrode Zn, the exceptionally thin-walled organic film has been found to excel when it is very uniform in thickness.

FIG. 1 is a schematic representation as to the shape of an exceptionally thin-walled organic film formed on a base steel sheet by means of a conventional coater. In FIG. 2, there is schematically shown the extremely uniform thinness of an exceptionally thin-walled organic film formed on a base steel sheet by means of cathodic polymerization.

Thinner coatings are by nature difficult to control with a coater. The coating fails to follow regularly the concavities and convexities on the surface of a plated steel sheet 1, but tends to be deposited mainly in the concavities of a base steel sheet and thus forms an organic film 2 of irregular thickness as seen in FIG. 1. Especially when viewed microscopically the organic film 2 is quite irregular in its thickness. The coat thickness of this organic film is greater in the concavities of the substrate. This makes it adversely affect any subsequent electrodeposition painting. Conversely, the coat is extremely thin in the convexities of the substrate and, hence, incapable of maintaining stable the materials that tend to corrode the Zn, with the result that the Zn dissolves progressively and develops corrosion-originating pockets or points.

Cathodic polymerization contributes greatly to simplified control of coating thicknesses with adjustments in electrolytic time and electrical quantity. As shown in FIG. 2, the coating accurately and uniformly follows the concavities and convexities on the surface of a plated steel sheet 1, providing an organic film 3 that has good properties of electrodeposition ability, weldability or corrosion resistance.

We have found that when it is formed by cathodic polymerization upon the Zn-base metal, the organic film is capable of affording unique physical characteristics, i.e., coating thickness uniformity and retentivity of Zn corrosive materials, which have superior insulation and impermeability to water and oxygen than conventional organic films.

Of prime importance, in the practice of the present invention, is that a zinc- or zinc alloy-plated layer and the like should underlie the organic film. The beneficial effects of the organic film formed by cathodic polymerization are achievable only by bonding to such a plated layer.

It has also been found that in the practice of this invention conspicuous cost reductions can be brought about by shortened electrolysis and omitted baking operation.

The present invention will now be described in greater detail.

Intensive research has been conducted by us on the rustproofing mechanism of organic film-coated multi-layered steel sheets commonly used for automobiles and on production methods enabling reductions in production equipment and reduced cost. Methods of film formation from cathodic polymerization have also been studied together with the properties of the resultant films. As a result, our new process has been discovered which does not require added plant investment and added production cost.

The organic film-coated plated steel sheet of the present invention has a zinc-based plated layer deposited inwardly of the surface of a steel sheet. By the term "the surface of a steel sheet" is meant either one or both of the surfaces of a base steel sheet. The term "zinc-based plating" means all types of plating using zinc that include but are not limited to platings with zinc alone, zinc alloys and zinc composite dispersions. Typical platings include zinc alone, platings with binary alloys such as Zn-Ni, Zn-Fe, Zn-Cr and the like, and platings with ternary alloys such as Zn-Ni-Cr, Zn-Co-Cr and the like. Platings with zinc composite dispersions may be used in which Zn-SiO$_2$, Zn-Co-Cr-Al$_2$O$_3$ and the like are included. The deposit amount of the plating is preferably in the range of not less than about 10 g/m$^2$ and of not more than about 90 g/m$^2$ from the point of view of corrosion resistance and cost control.

The organic film-coated plated steel sheet of the present invention has an organic film coated on a layer plated with a "zinc-based plating" as specified above. Coating of the organic film is achieved by electrolytic polymerization, preferably by cathodic reduction polymerization or anodic polymerization.

In the case of the cathodic polymerization coating according to the present invention, a given monomer bonds directly to the surface of the zinc-based plated layer by means of electrolysis and at the interface polymerizes into a film thereon. The resultant polymer also has firm bondability and, hence, adhesion to the plated layer surface and protects zinc corrosive materials from becoming eluted, thus leading to excellent and long-lasting corrosion resistance.

In addition, the film can be uniformly formed as discussed above, with a good and uniform fit to the shape of the plated layer. This prevents zinc from becoming locally eluted and thus reduces corrosion-originating points, thereby eventually improving corrosion resistance.

Conventional practice forms an organic film on a zinc-base plated steel sheet by painting, and in that instance, a chromate layer is often arranged as an intermediate layer. The reason behind this arrangement is that the organic film is not sufficiently adhesive to the plated metal surface when a coating is transferred with a coater on to the plated metal surface and then bonded by baking. By contrast, electrolytic polymerization coating causes monomers to bond directly to the metal surface, and then to polymerize in place, causing the finished polymer to be bonded especially firmly to the metal surface. Accordingly, chromate treatment is not always necessary in accordance with this invention.

In the cathodic polymerization coating, the amount of organic film to be applied is preferably in the range of not less than about 0.01 g/m$^2$ and of not more than about 3 g/m$^2$. Below about 0.01 g/m$^2$ the amount is not effective to provide sufficient corrosion resistance. Above about 3 g/m$^2$ the amount is too great and is less conductive to improved corrosion resistance and, moreover, is rather costly. Too thick a coating also invites difficulty in subsequent spot welding or electrodeposition painting.

As an organic film to be formed by electrolytic polymerization, it is preferred to use cathodic polymerization.

Where cathodic polymerization is employed, an organic film may be formed preferably of one or more monomers chosen from among vinyl pyridine, acrylic acid, methacrylic acid, acrylic acid ester, methacrylic acid ester, acrylonitrile, styrene, crotonic acid and acetonitrile, and derivatives thereof.

Cathodic polymerization is advantageous in that the substrate metal is not dissolved, electricity is efficiently useful in forming an organic film, film formation is possible for shortened electrolysis, and no equipment is necessary for removal of dissolved metal from an electrolytically polymerized liquid.

In any case, cathodic polymerization according to the present invention should be effected preferably at a current density of not lower than about 1 A/dm$^2$ for an electrolytic time of not longer than about 10 seconds. In general, electrolytic polymerization has heretofore been conducted at a current density of lower than 1 A/dm$^2$. Our experiments reveal, however, that current densities of below about 1 A/dm$^2$ are responsible for film formation of thickness irregularity, namely coating unevenness, on the surface of a steel sheet as well as unsightly appearance of the sheet surface. This is assumed to be due to presence of an oxide of Zn.

When film formation is performed by electrolytic treatment and, as a typical example, when a metal plating such as Zn plating or the like is formed on a steel sheet, the substrate is usually pretreated as by electrolytic degreasing and pickling to remove oxides therefrom. These oxides lead not only to reduced electrolysis efficiency during plating, and to irregular film formation, but also to poor appearance. A substrate for use in the present invention is a steel sheet treated with a Zn-base plating, and, therefore, removal of oxides prior to electrolytic polymerization is extremely adverse as it entails a damaged plated layer and added process steps. If it is conducted at a current density of lower than about 1 A/dm$^2$, electrolytic polymerization is thought to cause an irregular film to be formed on the substrate surface.

To add to the above drawbacks, current densities of lower than about 1 A/dm$^2$ need prolonged electrolysis to gain a desired coating thickness, which results in uneconomical production. Hence, a current density of not lower than about 1 A/dm$^2$ and an electrolytic time of not longer than about 10 seconds are preferred.

To further improve rust resistance, a chromate layer may be interposed between a first or innermost layer treated with zinc or a zinc alloy and the like and an electrolytically polymerized film layer. Being quite costly, use of the chromate layer should be determined depending upon the extent of corrosion resistance desired.

In the present invention, the term "chromate layer" means not only a narrow sense of "chromate layer" comprising chromium oxide and chromium hydroxide, but also a "chromium plating layer" including metal chromium.

The coating amount of the chromate layer is preferably in the range of not less than about 10 mg/m$^2$ and of not more than about 500 mg/m$^2$, expressed as Cr. Below about 10 mg/m$^2$ is not effective to attain sufficient corrosion resistance from the chromate layer. Above about 500 mg/m$^2$ produces no better results in improving such property and consumes excessive chromate and adds cost.

No particular restriction is imposed upon the method of chromate treatment to be used, and reactive chromate treatment, electrolytic chromate treatment, vapor deposition and the like may be employed. Film formation by means of electrolysis is thought to be most effective in view of the factor of cost reduction underlying the present invention.

EXAMPLES

With reference to the following examples, the present invention is further illustrated to demonstrate the beneficial effects thereof.

A 0.75 mm-thick, low-carbon steel sheet was pickled and degreased, followed by plating with Zn-base metal (where desired, further with chromate treatment). Film formation was then performed by means of cathodic polymerization to produce an organic film-coated steel sheet according to the invention. Performance evaluations were made on the resulting steel sheet for corrosion resistance, adhesion, spot weldability or electrodeposition ability.

To facilitate comparison, a 0.75 mm-thick, low-carbon steel sheet was pickled and degreased, followed by plating with a Zn-Ni alloy (Ni content: 12% by weight) (further with chromate treatment, if necessary). Epoxy resin was then painted with a painting coater to prepare an organic film-coated multi-layered steel sheet in common use. Another steel sheet was prepared in which electrolytic polymerization treatment was performed on a base steel sheet with Zn-base plating omitted. The steel sheet was tested as in the inventive one.

Zn-base Plating

Zn plating: Zn content—100% by weight

Zn-Ni plating: Ni content—12% by weight

Zn-Fe plating: Fe content—10% by weight

Zn-Cr plating: Cr content—10% by weight

Zn-Cr-Co-Al$_2$O$_3$ plating: Cr content—7% by weight, Co content—0.7% by weight, Al$_2$O$_3$ content—1% by weight (as Al)

Chromate Treatment reactive type: The steel sheet was immersed at 60° C. for 3 seconds in a reactive chromate treatment liquid containing Cr and Fe ions and then washed with water.

electrolytic type: The steel sheet was cathodically electrolyzed at a current density of 80 A/dm$^2$ in a solution containing SO$_4$ ion at an H$_2$SO/CrO$_3$=1% ratio and then washed with water.

paintable type: The steel sheet was painted by a coater with a solution containing Cr ion at a Cr(III)/Cr(VI)=1 ratio and then baked at an ultimate temperature of 150° C. for 20 seconds.

Electrolytic Polymerization

Cathodic treatment was conducted at 40° to 60° C. using a liquid containing 0.1 to 1 mol/l of a monomer. Purified water was used in principle as a solvent, but a mixture of methanol and water was employed when the monomer was less dissolvable. The methanol content was held to a minimum—enough to dissolve the monomer. The resultant specimen was checked for its performance characteristics under a set of conditions indicated below.

Deposit Amount of Zinc-based Metal

Fluorescent X-radiation was performed by usual, well known means.

Coating Amount of Chromate

The quantity of Cr was measured from Cr counts by fluorescent X-radiation.

Coating Amount of Organic Film

The number of C counts was measured by fluorescent X-radiation.

Composite Cycle Corrosion Test

Corrosion testing was made as one cycle of (1) to (3), namely (1) spraying of a 5% NaCl solution for 4 hours in a thermostatic chamber of 35° C., (2) drying at 60° C. for 2 hours, and (3) standing at 50° C. and at 45 RH (wet) for 2 hours. Inspection was performed as to whether red rust developed. This testing was adjudged by the cycle required for red rust to form.

Paint Adhesion

Electrodeposition painting was effected on to the specimen (thickness: 20 μm), which was then subjected to DuPont impact testing under the following conditions. Subsequently, adhesive tape testing was performed, and adhesion was determined by the peeling of an organic film.

DuPont impact testing: A sinker of 1 kg was allowed to drop at a distance of 50 cm from above on to the backside of the specimen by use of an impactor of ¼ inch in diameter.

o: not peeled x: peeled

Spot Weldability

To evaluate spot weldability, continuous welding was conducted at a pressure loading of 200 kgf and at a weld current of 9 kA, 10 Hz. In such instance, a welding chip was used which had been formed of an Al$_2$O$_3$ dispersion type copper alloy and having a tip of 6 mm in diameter. Measurement was made of the points of counts continuously welded by the time that the nugget diameter had become below the standard diameter. Evaluation was based on the following reference standards.

⊚: above 3,000 points o: 2,001–3,000 points

Δ: 1,000–2,000 points x: below 1,000 points

Electrodeposition Ability

Cathodic electrolytic treatment was conducted, with use of an automotive paint, in a bath of 28° C. at 280 V for 3 minutes. The number of craters and gas pin-holes was inspected, and evaluation was based on the following reference standards.

⊚: number of craters and gas pin-holes—0 o: number of craters and gas pin-holes—1 to 5

Δ: number of craters and gas pin-holes—6 to 10 x: number of craters and gas pin-holes—above 11

Cost Evaluation of Equipment

Production should be made feasible with effective use of post-treatment facilities such as reserve tanks of ordinary Zn-base plating equipment. The details of evaluation were based on the following criteria.

⊚: When electrolysis is effected at the same line speed as in Zn-base plating, production can be considered feasible with 3 or less plating tanks (expected to be substantially without added plant installation).

○: When electrolysis is effected at the same line speed as in Zn-base plating, production can be considered feasible with 5 or less plating tanks (expected to be substantially without added plant installation, or with a small scale of additional installations, if any).

x: New plants can be considered necessary to be installed.

Cost Evaluation of Productivity

⊚: Production can be considered feasible as integrated with ordinary Zn-base plating equipment, and with least control factors.

○: Production can be considered feasible as integrated with ordinary Zn-base plating equipment, but with additional control factors.

x: Coiling can be considered to be firstly needed after common plating with Zn-base metal, followed by transfer and treatment of the coil at separate equipment.

The test results are listed in Tables 1 (1) to 1 (3).

Inventive Examples 1 to 69 are all satisfactory in respect of all of the characteristics tested. These examples have demonstrated those steel sheets for automotive use that excel in corrosion resistance, weldability, electrodeposition paintability or paint adhesion with reduced equipment requirements and reduced cost.

Comparative Examples 1 to 4 were insufficient with respect to corrosion resistance as they were devoid of a Zn-base plated layer that is an important component for the practice of the present invention.

In Comparative Examples 5 to 8, an electrolytically polymerized film was formed in a larger coating amount. To this end, a large number of plating tanks and a large floor space therefor have been found to be necessary. Zn-base plating equipment in common use for rust-proof automotive steel sheets can no longer meet automobile manufacturers' requirements with consequential need for new plant investments. In addition to these problems, the steel sheets of Comparative Examples 5 to 8 are not sufficient in improving corrosion resistance as they are free from a Zn-base plated layer as contrasted to the inventive steel sheets and, conversely, are deteriorative in respect of weldability and electrodeposition paint ability.

Comparative Examples 9 to 11 revealed reduced adhesion to a Zn-base plated layer and poor corrosion resistance due to omission of an electrolytically polymerized film and of chromate treatment.

Comparative Example 12 is an organic film-coated multilayered steel sheet recently used as a rustproof steel sheet for automobiles, but is highly susceptible to a rise in cost from the point of view of equipment and production.

TABLE 1-1

Example

| | Zn-base Plating | | Chromate | | Cathodic Polymerization | | Coating | Cost Evaluation | | Performance Test | | | Electrodeposition ability |
|---|---|---|---|---|---|---|---|---|---|---|---|---|---|
| No. | Kind | Amount (g/m$^2$) | Type | Amount (mg/m$^2$) | Monomer | Condition | Amount (g/m$^2$) | Equipment | Productivity | CCT (cycle) | Adhesion | Weldability | |
| 1 | Zn—Ni plating | 20 | — | — | Vinyl Pyridine | −10 Å/dm$^2$ × 5 sec | 1.0 | ⊚ | ⊚ | 120 | ○ | ⊚ | ⊚ |
| 2 | Zn—Ni plating | 20 | — | — | Acrylonitrile | −5 Å/dm$^2$ × 7 sec | 0.01 | ⊚ | ⊚ | 100 | ○ | ⊚ | ⊚ |
| 3 | Zn—Ni plating | 20 | — | — | Styrene | −30 Å/dm$^2$ × 5 sec | 0.1 | ⊚ | ⊚ | 100 | ○ | ⊚ | ⊚ |
| 4 | Zn—Ni plating | 20 | — | — | Acrylic Acid | −20 Å/dm$^2$ × 3 sec | 0.5 | ⊚ | ⊚ | 110 | ○ | ⊚ | ⊚ |
| 5 | Zn—Ni plating | 20 | — | — | Acetonitrile | −1 Å/dm$^2$ × 10 sec | 1.2 | ⊚ | ⊚ | 120 | ○ | ⊚ | ⊚ |
| 6 | Zn—Ni plating | 20 | — | — | Crotonic Acid | −20 Å/dm$^2$ × 5 sec | 0.3 | ⊚ | ⊚ | 110 | ○ | ⊚ | ⊚ |
| 7 | Zn—Ni plating | 20 | — | — | Methyl Metharylate | −5 Å/dm$^2$ × 10 sec | 2.0 | ⊚ | ⊚ | 130 | ○ | ⊚ | ⊚ |
| 8 | Zn—Ni plating | 10 | — | — | Vinyl Pyridine | −10 Å/dm$^2$ × 5 sec | 1.0 | ⊚ | ⊚ | 100 | ○ | ⊚ | ⊚ |
| 9 | Zn—Ni plating | 30 | — | — | Acrylonitrile | −5 Å/dm$^2$ × 7 sec | 0.01 | ⊚ | ⊚ | 150 | ○ | ⊚ | ⊚ |
| 10 | Zn—Ni plating | 60 | — | — | Styrene | −30 Å/dm$^2$ × 5 sec | 0.1 | ⊚ | ⊚ | 250 | ○ | ⊚ | ⊚ |

TABLE 1-2

Example

| | Zn-base Plating | | Chromate | | Cathodic Polymerization | | Coating | Cost Evaluation | | Performance Test | | | Electro deposition ability |
|---|---|---|---|---|---|---|---|---|---|---|---|---|---|
| No. | Kind | Amount (g/m²) | Type | Amount (mg/m²) | Monomer | Condition | Amount (g/m²) | Equipment | Productivity | CCT (cycle) | Adhesion | Weldability | |
| 11 | Zn—Ni plating | 5 | — | — | Acrylic Acid | $-20$ Å/dm² × 3 sec | 0.5 | ⊚ | ⊚ | 20 | ○ | ⊚ | ⊚ |
| 12 | Zn—Ni plating | 80 | — | — | Acrylonitrile | $-1$ Å/dm² × 10 sec | 1.2 | ⊚ | ○ | 150 | ○ | ⊚ | ⊚ |
| 13 | Zn—Ni plating | 20 | Reactive | 50 | Vinyl Pyridine | $-10$ Å/dm² × 5 sec | 0.02 | ○ | ○ | 120 | ○ | ○ | ○ |
| 14 | Zn—Ni plating | 20 | Electrolytic | 50 | Vinyl Pyridine | $-10$ Å/dm² × 5 sec | 0.8 | ○ | ○ | 150 | ○ | ○ | ○ |
| 15 | Zn—Ni plating | 20 | Electrolytic | 5 | Vinyl Pyridine | $-10$ Å/dm² × 5 sec | 0.8 | ○ | ○ | 120 | ○ | ⊚ | ⊚ |
| 16 | Zn—Ni plating | 20 | Electrolytic | 10 | Vinyl Pyridine | $-10$ Å/dm² × 5 sec | 0.8 | ○ | ○ | 130 | ○ | ○ | ○ |
| 17 | Zn—Ni plating | 20 | Electrolytic | 100 | Vinyl Pyridine | $-10$ Å/dm² × 5 sec | 0.8 | ○ | ○ | 170 | ○ | ○ | ○ |
| 18 | Zn—Ni plating | 20 | Electrolytic | 300 | Acrylic Acid | $-20$ Å/dm² × 3 sec | 0.4 | ○ | ○ | 170 | ○ | ○ | ○ |
| 19 | Zn—Ni plating | 20 | Electrolytic | 300 | Vinyl Pyridine | $-10$ Å/dm² × 5 sec | 0.8 | ○ | ○ | 200 | ○ | ○ | ○ |
| 20 | Zn—Ni plating | 20 | Electrolytic | 500 | Vinyl Pyridine | $-10$ Å/dm² × 5 sec | 0.8 | ○ | ○ | 300 | ○ | ○ | ○ |

TABLE 1-3

Example

| | Zn-base Plating | | Chromate | | Cathodic Polymerization | | Coating | Cost Evaluation | | Performance Test | | | Electro deposition ability |
|---|---|---|---|---|---|---|---|---|---|---|---|---|---|
| No. | Kind | Amount (g/m²) | Type | Amount (mg/m²) | Monomer | Condition | Amount (g/m²) | Equipment | Productivity | CCT (cycle) | Adhesion | Weldability | |
| 21 | Zn—Ni plating | 20 | Electrolytic | 700 | Vinyl Pyridine | $-10$ Å/dm² × 5 sec | 0.8 | ○ | ○ | 400 | ○ | △ | △ |
| 22 | Zn-plating | 20 | — | — | Vinyl Pyridine | $-10$ Å/dm² × 5 sec | 1.0 | ⊚ | ⊚ | 80 | ○ | ⊚ | ⊚ |
| 23 | Zn-plating | 20 | — | — | Acrylonitrile | $-5$ Å/dm² × 7 sec | 0.01 | ⊚ | ⊚ | 60 | ○ | ⊚ | ⊚ |
| 24 | Zn-plating | 20 | — | — | Styrene | $-30$ Å/dm² × 5 sec | 0.1 | ⊚ | ⊚ | 70 | ○ | ⊚ | ⊚ |
| 25 | Zn-plating | 20 | — | — | Acrylic Acid | $-20$ Å/dm² × 3 sec | 0.5 | ⊚ | ⊚ | 80 | ○ | ⊚ | ⊚ |
| 26 | Zn-plating | 20 | Electrolytic | 50 | Vinyl Pyridine | $-10$ Å/dm² × 5 sec | 0.8 | ○ | ○ | 100 | ○ | ○ | ○ |
| 27 | Zn-plating | 20 | Electrolytic | 50 | Acrylonitrile | $-5$ Å/dm² × 7 sec | 0.05 | ○ | ○ | 60 | ○ | ○ | ○ |
| 28 | Zn-plating | 20 | Electrolytic | 50 | Styrene | $-30$ Å/dm² × 5 sec | 0.1 | ○ | ○ | 90 | ○ | ○ | ○ |
| 29 | Zn-plating | 20 | Electrolytic | 50 | Acrylic Acid | $-20$ Å/dm² × 3 sec | 0.5 | ○ | ○ | 100 | ○ | ○ | ○ |
| 30 | Zn—Cr plating | 20 | — | 50 | Vinyl Pyridine | $-15$ Å/dm² × 5 sec | 0.8 | ○ | ○ | 200 | ○ | ○ | ○ |

TABLE 4

Example

| | Zn-base Plating | | Chromate | | Cathodic Polymerization | | Coating | Cost Evaluation | | Performance Test | | | Electro deposition ability |
|---|---|---|---|---|---|---|---|---|---|---|---|---|---|
| No. | Kind | Amount (g/m²) | Type | Amount (mg/m²) | Monomer | Condition | Amount (g/m²) | Equipment | Productivity | CCT (cycle) | Adhesion | Weldability | |
| 31 | Zn—Cr plating | 20 | — | — | Acrylonitrile | −10 Å/dm² × 7 sec | 0.005 | ⊚ | ⊚ | 150 | ○ | ⊚ | ⊚ |
| 32 | Zn—Cr plating | 20 | — | — | Styrene | −30 Å/dm² × 5 sec | 0.05 | ⊚ | ⊚ | 180 | ○ | ⊚ | ⊚ |
| 33 | Zn—Cr plating | 20 | — | — | Acrylic Acid | −20 Å/dm² × 5 sec | 0.4 | ⊚ | ⊚ | 200 | ○ | ⊚ | ⊚ |
| 34 | Zn—Cr plating | 20 | Electrolytic | 50 | Vinyl Pyridine | −10 Å/dm² × 5 sec | 0.8 | ○ | ○ | 260 | ○ | ○ | ○ |
| 35 | Zn—Cr plating | 20 | Electrolytic | 50 | Acrylonitrile | −5 Å/dm² × 7 sec | 0.005 | ○ | ○ | 200 | ○ | ○ | ○ |
| 36 | Zn—Cr plating | 20 | Electrolytic | 50 | Styrene | −30 Å/dm² × 5 sec | 0.05 | ○ | ○ | 230 | ○ | ○ | ○ |
| 37 | Zn—Cr plating | 20 | Electrolytic | 50 | Acrylic Acid | −20 Å/dm² × 3 sec | 0.4 | ○ | ○ | 160 | ○ | ○ | ○ |
| 38 | Zn—Fe plating | 20 | — | — | Vinyl Pyridine | −10 Å/dm² × 5 sec | 1.0 | ⊚ | ⊚ | 100 | ○ | ⊚ | ⊚ |
| 39 | Zn—Fe plating | 20 | — | — | Acrylonitrile | −5 Å/dm² × 7 sec | 0.01 | ⊚ | ⊚ | 80 | ○ | ⊚ | ⊚ |
| 40 | Zn—Fe plating | 20 | — | — | Styrene | −30 Å/dm² × 5 sec | 0.1 | ⊚ | ⊚ | 90 | ○ | ⊚ | ⊚ |

TABLE 1-5

Example

| | Zn-base Plating | | Chromate | | Cathodic Polymerization | | Coating | Cost Evaluation | | Performance Test | | | Electro deposition ability |
|---|---|---|---|---|---|---|---|---|---|---|---|---|---|
| No. | Kind | Amount (g/m²) | Type | Amount (mg/m²) | Monomer | Condition | Amount (g/m²) | Equipment | Productivity | CCT (cycle) | Adhesion | Weldability | |
| 41 | Zn—Fe plating | 20 | — | — | Acrylic Acid | −20 Å/dm² × 3 sec | 0.5 | ⊚ | ⊚ | 100 | ○ | ⊚ | ⊚ |
| 42 | Zn—Fe plating | 20 | *Elect | 50 | Vinyl Pyridine | −10 Å/dm² × 5 sec | 0.8 | ○ | ○ | 130 | ○ | ○ | ○ |
| 43 | Zn—Fe plating | 20 | *Elect | 50 | Acrylonitrile | −5 Å/dm² × 7 sec | 0.005 | ○ | ○ | 80 | ○ | ○ | ○ |
| 44 | Zn—Fe plating | 20 | *Elect | 50 | Styrene | −30 Å/dm² × 5 sec | 0.1 | ○ | ○ | 110 | ○ | ○ | ○ |
| 45 | Zn—Fe plating | 20 | *Elect | 50 | Acrylic Acid | −20 Å/dm² × 3 sec | 0.5 | ○ | ○ | 120 | ○ | ○ | ○ |
| 46 | Zn—Cr—Co—Al₂O₃ plating | 20 | — | — | Vinyl Pyridine | −15 Å/dm² × 5 sec | 0.8 | ⊚ | ⊚ | 230 | ○ | ⊚ | ⊚ |
| 47 | Zn—Cr—Co—Al₂O₃ plating | 20 | — | — | Acrylonitrile | −15 Å/dm² × 7 sec | 0.005 | ⊚ | ⊚ | 180 | ○ | ⊚ | ⊚ |
| 48 | Zn—Cr—Co—Al₂O₃ plating | 20 | — | — | Styrene | −15 Å/dm² × 5 sec | 0.05 | ⊚ | ⊚ | 210 | ○ | ⊚ | ⊚ |
| 49 | Zn—Cr—Co—Al₂O₃ plating | 20 | — | — | Acrylic Acid | −15 Å/dm² × 5 sec | 0.4 | ⊚ | ⊚ | 230 | ○ | ⊚ | ⊚ |
| 50 | Zn—Cr—Co—Al₂O₃ plating | 20 | *Elect | 50 | Vinyl Pyridine | −15 Å/dm² × 5 sec | 0.8 | ○ | ○ | 300 | ○ | ○ | ○ |

*Elect means Electrolytic.

TABLE 1-6

Example

| | Zn-base Plating | | Chromate | | Electrolytic Polymerization | | Coating | Cost Evaluation | | Performance Test | | | Electrodeposition ability |
|---|---|---|---|---|---|---|---|---|---|---|---|---|---|
| No. | Kind | Amount (g/m$^2$) | Type | Amount (mg/m$^2$) | Monomer | Condition | Amount (g/m$^2$) | Equipment | Productivity | CCT (cycle) | Adhesion | Weldability | |
| 51 | Zn—Cr—Co—Al$_2$OI$_3$ plating | 20 | *Elect | 50 | Acrylonitrile | −5 Å/dm$^2$ × 7 sec | 0.005 | ◯ | ◯ | 230 | ◯ | ◯ | ◯ |
| 52 | Zn—Cr—Co—Al$_2$O$_3$ plating | 20 | *Elect | 50 | Styrene | −30 Å/dm$^2$ × 5 sec | 0.05 | ◯ | ◯ | 260 | ◯ | ◯ | ◯ |
| 53 | Zn—Cr—Co—Al$_2$O$_3$ plating | 20 | *Elect | 50 | Acrylic Acid | −20 Å/dm$^2$ × 3 sec | 0.4 | ◯ | ◯ | 200 | ◯ | ◯ | ◯ |
| 54 | Zn plating | 20 | — | — | Pyrrole | +10 Å/dm$^2$ × 3 sec | 0.1 | ⊚ | ⊚ | 70 | ◯ | ⊚ | ⊚ |
| 55 | Zn plating | 20 | — | — | Phenol | +15 Å/dm$^2$ × 5 sec | 0.5 | ⊚ | ⊚ | 70 | ◯ | ⊚ | ⊚ |
| 56 | Zn plating | 20 | *Elect | 50 | Pyrrole | +10 Å/dm$^2$ × 3 sec | 0.5 | ◯ | ◯ | 120 | ◯ | ◯ | ◯ |
| 57 | Zn plating | 20 | *Elect | 50 | Phenol | +15 Å/dm$^2$ × 5 sec | 0.3 | ◯ | ◯ | 100 | ◯ | ◯ | ◯ |
| 58 | Zn—Ni plating | 20 | — | — | Pyrrole | +10 Å/dm$^2$ × 3 sec | 0.1 | ⊚ | ⊚ | 120 | ◯ | ⊚ | ⊚ |
| 59 | Zn—Ni plating | 20 | — | — | Phenol | +15 Å/dm$^2$ × 5 sec | 0.5 | ⊚ | ⊚ | 100 | ◯ | ⊚ | ⊚ |
| 60 | Zn—Ni plating | 20 | *Elect | 50 | Pyrrole | +10 Å/dm$^2$ × 3 sec | 0.5 | ◯ | ◯ | 150 | ◯ | ◯ | ◯ |

*Elect means Electrolytic.

TABLE 1-7

Example

| | Zn-base Plating | | Chromate | | Electrolytic Polymerization | | Coating | Cost Evaluation | | Performance Test | | | Electrodeposition ability |
|---|---|---|---|---|---|---|---|---|---|---|---|---|---|
| No. | Kind | Amount (g/m$^2$) | Type | Amount (mg/m$^2$) | Monomer | Condition | Amount (g/m$^2$) | Equipment | Productivity | CCT (cycle) | Adhesion | Weldability | |
| 61 | Zn—Ni plating | 20 | *Elect | 50 | Phenol | +15 Å/dm$^2$ × 5 sec | 0.3 | ◯ | ◯ | 130 | ◯ | ◯ | ◯ |
| 62 | Zn—Cr plating | 20 | — | — | Pyrrole | +10 Å/dm$^2$ × 3 sec | 0.1 | ⊚ | ⊚ | 180 | ◯ | ⊚ | ⊚ |
| 63 | Zn—Cr plating | 20 | — | — | Phenol | +15 Å/dm$^2$ × 5 sec | 0.5 | ⊚ | ⊚ | 200 | ◯ | ⊚ | ⊚ |
| 64 | Zn—Cr plating | 20 | *Elect | 50 | Pyrrole | +10 Å/dm$^2$ × 3 sec | 0.5 | ◯ | ◯ | 230 | ◯ | ◯ | ◯ |
| 65 | Zn—Cr plating | 20 | *Elect | 50 | Phenol | +15 Å/dm$^2$ × 5 sec | 0.3 | ◯ | ◯ | 230 | ◯ | ◯ | ◯ |
| 66 | Zn—Cr—Co—Al$_2$O$_3$ plating | 20 | — | — | Pyrrole | +10 Å/dm$^2$ × 3 sec | 0.1 | ⊚ | ⊚ | 210 | ◯ | ⊚ | ⊚ |
| 67 | Zn—Cr—Co—Al$_2$O$_3$ plating | 20 | — | — | Phenol | +15 Å/dm$^2$ × 5 sec | 0.5 | ⊚ | ⊚ | 230 | ◯ | ⊚ | ⊚ |
| 68 | Zn—Cr—Co—Al$_2$O$_3$ plating | 20 | *Elect | 50 | Pyrrole | +10 Å/dm$^2$ × 3 sec | 0.5 | ◯ | ◯ | 300 | ◯ | ◯ | ◯ |
| 69 | Zn—Cr—Co—Al$_2$O$_3$ plating | 20 | *Elect | 50 | Phenol | +15 Å/dm$^2$ × 5 sec | 0.3 | ◯ | ◯ | 230 | ◯ | ◯ | ◯ |

*Elect means Electrolytic.

TABLE 1-8

Comparative Example

| No. | Zn-base Plating Kind | Amount (g/m²) | Chromate Type | Amount (mg/m²) | Electrolytic Polymerization Monomer | Condition | Coating Amount (g/m²) | Cost Evaluation Equipment | Productivity | Performance Test CCT (cycle) | Adhesion | Weldability | Electrodeposition ability |
|---|---|---|---|---|---|---|---|---|---|---|---|---|---|
| 1 | — | — | — | — | Vinyl Pyridine | −10 Å/dm² × 5 sec | 1.0 | ◉ | ◉ | 3 | ○ | ◉ | ◉ |
| 2 | — | — | — | — | Acrylonitorile | −5 Å/dm² × 7 sec | 0.005 | ◉ | ◉ | 1 | ○ | ◉ | ◉ |
| 3 | — | — | — | — | Pyrrole | +10 Å/dm² × 3 sec | 0.5 | ◉ | ◉ | 3 | ○ | ◉ | ◉ |
| 4 | — | — | — | — | Phenol | +15 Å/dm² × 5 sec | 0.8 | ◉ | ◉ | 3 | ○ | ◉ | ◉ |
| 5 | — | — | — | — | Vinyl Pyridine | −10 Å/dm² × 3 min | 15 | x | ○ | 7 | ○ | x | x |
| 6 | — | — | — | — | Acrylonitorile | −5 Å/dm² × 5 min | 10 | x | ○ | 10 | ○ | x | x |
| 7 | — | — | — | — | Pyrrole | +10 Å/dm² × 1 min | 15 | x | ○ | 10 | ○ | x | x |
| 8 | — | — | — | — | Phenol | +15 Å/dm² × 10 min | 18 | x | ○ | 10 | ○ | x | x |
| 9 | Zn plating | 20 | — | — | — | — | — | ◉ | ◉ | 40 | x | ◉ | ◉ |
| 10 | Zn—Ni plating | 20 | — | — | — | — | — | ◉ | ◉ | 60 | x | ◉ | ◉ |
| 11 | Zn—Ni plating | 20 | — | — | — | Coater-painted* | 0.5 | x | x | 60 | x | ◉ | ◉ |
| 12 | Zn—Ni plating | 20 | paintable | 50 | — | Coater-painted* | 0.5 | x | x | 90 | ○ | ○ | ○ |

*Epoxy resin was painted by coater.

According to the present invention, an organic film-coated plated steel sheet is provided which is resistant to corrosion, weldable, paintable by electrodeposition or adhesive to paints, and is excellent as a rust-proof steel sheet particularly for use in automobile bodies.

Also provided is a process for producing such steel with saved equipment and with reduced production cost which could not be afforded by the prior art.

What is claimed is:

1. An organic film-coated plated steel sheet comprising a steel sheet, a zinc-base plated layer deposited on said steel sheet and an organic film layer adhered by cathodic polymerization of a monomer to said zinc-base plated layer.

2. The organic film-coated plated steel sheet according to claim 1, further comprising a chromate layer interposed between said zinc-base plated layer and said organic film layer, and wherein said organic film layer is adhered by said cathodic polymerization to said chromate layer.

3. The organic film-coated plated steel sheet according to claim 1, wherein said zinc-base plated layer is deposited in an amount of about 10 to 90 g/m², and said organic film layer is adhered in an amount of about 0.01 to 3 g/m².

4. The organic film-coated plated steel sheet according to claim 2, wherein said zinc-base plated layer is deposited in an amount of about 10 to 90 g/m², said chromate layer is coated in an amount of about 10 to 500 mg/m² in terms of Cr, and said organic film layer is adhered in an amount of about 0.01 to 3 g/m².

5. An organic film-coated plated steel sheet comprising a steel sheet, a zinc-based plated layer deposited on said steel sheet and an organic film layer adhered by cathodic polymerization of a monomer to said zinc-based plated layer, said monomer being at least one organic monomer selected from the group consisting of vinyl pyridine, acrylic acid, methacrylic acid, acrylic acid ester, methacrylic acid ester, acrylonitrile, styrene, crotonic acid and acetonitrile, and derivatives thereof.

6. An organic film-coated plated steel sheet comprising a steel sheet, a zinc-based plated layer deposited on said steel sheet and an organic film layer adhered by cathodic polymerization of a monomer to said zinc-based plated layer, wherein said zinc-base plated layer is deposited in an amount of 10–90 g/m², wherein said organic film layer is deposited in an amount of about 0.01–3 g/m², and wherein cathodic polymerization is effected at a current density not lower than about 1 A/dm² for an electrolytic time no longer than about 10 seconds.

* * * * *

UNITED STATES PATENT AND TRADEMARK OFFICE
CERTIFICATE OF CORRECTION

PATENT NO. : 5,834,128
DATED : November 10, 1998
INVENTOR(S) : Hamahara, et al.

It is certified that error appears in the above-identified patent and that said Letters Patent is hereby corrected as shown below:

In Column 6, line 5, please change "electrolytic" to --cathodic--.

In Column 9, at Table 1-1, under sub-subheading "Condition", in Example Nos. 1-10, please change "Å" to --A--.

In Column 11, at Table 1-2, under sub-subheading "Condition", in Example Nos. 11-20, please change "Å" to --A--.

In Column 11, at Table 1-3, under sub-subheading "Condition", in Example Nos. 21-30, please change "Å" to --A--;
under subheading "Chromate", under sub-subheading "Amount (mg/m$^2$)", in Example No. 30, please change "50" to -- - --.

In Column 12, at Table 1-3, under subheading "Cost Evaluation", under sub-subheading "Equipment", in Example No. 30, please change "○" to -- ⊚ --;
under sub-subheading "Productivity", in Example No. 30, please change "○" to -- ⊚ --;

UNITED STATES PATENT AND TRADEMARK OFFICE
CERTIFICATE OF CORRECTION

PATENT NO. : 5,834,128
DATED : November 10, 1998
INVENTOR(S) : Hamahara, et al.

It is certified that error appears in the above-identified patent and that said Letters Patent is hereby corrected as shown below:

under subheading "Performance Test", under sub-subheading "Weldability", in Example No. 30, please change "○" to -- ⊚ --;
under subheading "Performance Test", under sub-subheading "Electro deposition ability", in Example No. 30, please change "○" to -- ⊚ --.

In Column 13, line 1, please change "TABLE 4" to --TABLE 1-4--, and under sub-subheading "Condition", of the same, in Example Nos. 31-40, please change "Å" to --A--.

In Column 13, at Table 1-5, under sub-subheading "Condition", in Example Nos. 41-50, please change "Å" to --A--;
under sub-subheading "Condition", please change the following:

In Example No. 47, please change "-15 $A/dm^2$ x 7 sec" to -- -10 $A/dm^2$ x 7 sec--;
In Example No. 48, please change "-15 $A/dm^2$ x 5 sec" to -- -30 $A/dm^2$ x 5 sec--;
In Example No. 49, please change "-15 $A/dm^2$ x 5 sec" to -- -20 $A/dm^2$ x 5 sec--;
In Example No. 50, please change "-15 $A/dm^2$ x 5 sec" to -- -10 $A/dm^2$ x 5 sec--.

In Column 15, at Table 1-6, under sub-subheading "Condition", in Example Nos. 51-60, please change "Å" to --A--.

In Column 16, at Table 1-6, under sub-subheading "CCT (cycle)", in Example No. 55, please change "70" to --80--.

UNITED STATES PATENT AND TRADEMARK OFFICE
CERTIFICATE OF CORRECTION

PATENT NO. : 5,834,128
DATED : November 10, 1998
INVENTOR(S) : Hamahara, et al.

It is certified that error appears in the above-identified patent and that said Letters Patent is hereby corrected as shown below:

In Column 15, at Table 1-7, under sub-subheading "Condition", in Example Nos. 61-69, please change "Å" to --A--.

In Column 17, at Table 1-8, under sub-subheading "Condition", in Example Nos. 1-8, please change "Å" to --A--.

Signed and Sealed this

Twenty-first Day of September, 1999

Attest:

Q. TODD DICKINSON

*Attesting Officer*          *Acting Commissioner of Patents and Trademarks*